(12) United States Patent
Kim

(10) Patent No.: US 11,318,379 B2
(45) Date of Patent: May 3, 2022

(54) GAME SERVER AND METHOD OF SHARING NOTE IN THE GAME SERVER

(71) Applicant: NCSOFT Corporation, Seoul (KR)

(72) Inventor: Kyu Hyun Kim, Gyeonggi-do (KR)

(73) Assignee: NCSOFT Corporation, Seoul (KR)

( * ) Notice: Subject to any disclaimer, the term of this patent is extended or adjusted under 35 U.S.C. 154(b) by 13 days.

(21) Appl. No.: 16/412,517

(22) Filed: May 15, 2019

(65) Prior Publication Data
US 2019/0351322 A1    Nov. 21, 2019

(30) Foreign Application Priority Data
May 16, 2018   (KR) .......................... 10-2018-0056025

(51) Int. Cl.
  *A63F 13/35* (2014.01)
  *H04L 67/131* (2022.01)
  *A63F 13/63* (2014.01)
  *A63F 13/5372* (2014.01)

(52) U.S. Cl.
  CPC .......... *A63F 13/35* (2014.09); *A63F 13/5372* (2014.09); *A63F 13/63* (2014.09); *H04L 67/38* (2013.01); *A63F 2300/306* (2013.01); *A63F 2300/53* (2013.01)

(58) Field of Classification Search
  CPC ...... A63F 13/35; A63F 13/5372; A63F 13/63; A63F 2300/306; A63F 2300/53; H04L 67/38

USPC .......................................................... 463/31
See application file for complete search history.

(56) References Cited

U.S. PATENT DOCUMENTS

| | | | | |
|---|---|---|---|---|
| 8,751,159 B2* | 6/2014 | Hall | ...................... | H04W 4/021 701/467 |
| 8,814,691 B2* | 8/2014 | Haddick | ............... | G06F 1/1673 463/42 |
| 8,935,341 B2* | 1/2015 | Bosworth | ............... | H04W 4/21 709/204 |
| 2007/0117634 A1* | 5/2007 | Hamilton | ............ | G07F 17/3227 463/42 |
| 2010/0292011 A1* | 11/2010 | Kira | ....................... | A63F 13/497 463/43 |
| 2011/0151955 A1* | 6/2011 | Nave | ...................... | A63F 13/837 463/2 |
| 2012/0196661 A1* | 8/2012 | Snoddy | ................. | A63F 9/0612 463/9 |
| 2012/0276998 A1* | 11/2012 | Zhu | ...................... | A63F 13/2145 463/31 |
| 2015/0352451 A1* | 12/2015 | Brenden | ............... | A63F 13/795 463/31 |

\* cited by examiner

*Primary Examiner* — Allen Chan
(74) *Attorney, Agent, or Firm* — The PL Law Group, PLLC

(57) ABSTRACT

A game server according to one embodiment includes a communication interface and a processor configured to receive a note at a specific location in a game from a user, match the note with the specific location, and store the note to a storage medium, and when the specific location is displayed on a gaming device of the user, output the note through the gaming device.

14 Claims, 7 Drawing Sheets

GAME SERVER AND METHOD OF SHARING NOTE IN THE GAME SERVER

CROSS-REFERENCE TO RELATED APPLICATION(S)

This application claims the benefit under 35 USC § 119(a) of Korean Patent Application No. 10-2018-0056025, filed on May 16, 2018, in the Korean Intellectual Property Office, the entire disclosure of which is incorporated herein by reference for all purposes.

BACKGROUND

1. Field

The following description relates to a game server and a method of sharing a note in the game server.

2. Description of Related Art

Recently, various types of content services using the Internet, for example, messenger services, online shopping malls, and gaming services, have been provided. In particular, a gaming service field among the various content services, the speed of development and diffusion of a gaming service is rapidly increasing and accordingly many Internet users are using an Internet-based online game service. Examples of the online game may include a massive multiplayer online role-playing game (MMPRPG), a role-playing game (RPG), a board game, a simulation game, and the like.

In addition, with the improvement of hardware performance and network technology, games have become increasingly complicated and various contents can be contained in the games. With the development of such games, there is a growing need for providing various functions for enhancing convenience of using games.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In one general aspect, there is provided a game server including a communication interface and a processor configured to: receive, through the communication interface, a note at a specific location in a game from a user, match the note with the specific location, and store the note to a storage medium and when the specific location is displayed on a gaming device of the user, output the note through the gaming device.

The processor may match the note with location information on a game screen displayed on the gaming device of the user at the time of receiving the note and store the note to the storage medium.

The processor may match the note with location information selected by the user at the time of receiving the note and store the note to the storage medium.

The processor may receive, through the communication interface, as the note, a path along which an in-game character of the user moves in the game for a predetermined period of time.

The processor may receive, through the communication interface, information on one or more other users to share the note from the user, associate the received information on other users with the note, and store the note to the storage medium.

When the specific location is displayed on gaming devices of the one or more other users, the processor may output the note through the gaming devices of the one or more other users.

The processor may receive, through the communication interface, a validity period of the note from the user, associate the note with the received validity period, and store the note to the storage medium.

The processor may mark the specific location on a map displayed on the gaming device and display the specific location along with the map.

In another general aspect, there is provided a method of sharing a note in a game server including receiving a note at a specific location in a game from a user, matching the note with the specific location and storing the note, and, when the specific location is displayed on a gaming device of the user, outputting the note through the gaming device.

The storing of the note may include matching the note with location information on a game screen displayed on the gaming device of the user at the time of receiving the note, and storing the note.

The storing of the note may include matching the note with location information selected by the user at the time of receiving the note, and storing the note.

The storing of the note may include receiving, as the note, a path along which an in-game character of the user moves in the game for a predetermined period of time.

The storing of the note may include receiving information on one or more other users to share the note from the user, associating the received information on other users with the note, and storing the note.

The outputting of the note may include, when the specific location is displayed on gaming devices of the one or more other users, outputting the note through the gaming devices of the one or more other users.

The storing of the note may include receiving a validity period of the note from the user, associating the note with the received validity period, and storing the note.

The outputting of the note may include marking the specific location on a map displayed on the gaming device and displaying the specific location along with the map.

Other features and aspects will be apparent from the following detailed description, the drawings, and the claims.

Figure 1:
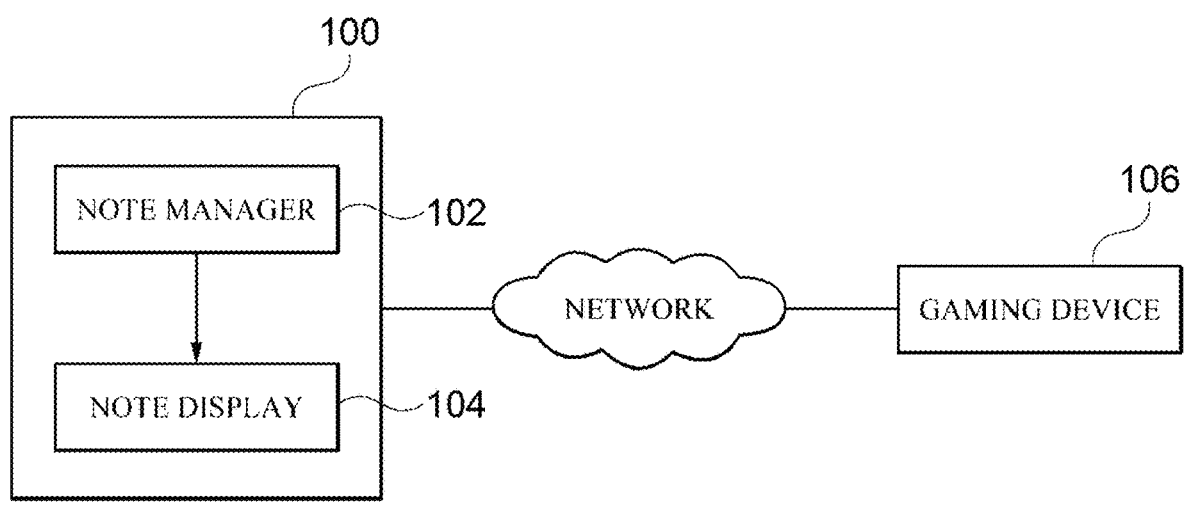
FIG. 1 is a diagram illustrating a configuration of a game server 100 according to one embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art.

Descriptions of well-known functions and constructions may be omitted for increased clarity and conciseness. Also, terms described in below are selected by considering functions in the embodiment and meanings may vary depending on, for example, a user or operator's intentions or customs. Therefore, definitions of the terms should be made on the basis of the overall context. The terminology used in the detailed description is provided only to describe embodiments of the present disclosure and not for purposes of limitation. Unless the context clearly indicates otherwise, the singular forms include the plural forms. It should be understood that the terms "comprises" or "includes" specify some features, numbers, steps, operations, elements, and/or combinations thereof when used herein, but do not preclude the presence or possibility of one or more other features, numbers, steps, operations, elements, and/or combinations thereof in addition to the description.

The term "game" as used herein will be understood to mean software that one or more gamers can enjoy using an input device mounted in or connected to a gaming device. Generally, the game proceeds by the gamers manually maneuver a player character or manipulating a movement of an in-game object, and the game may be classified into various genres, such as role playing, adventure, arcade, and the like.

The term "gaming device" as used herein will be understood to mean hardware that executes game software, performs a calculation according to an input of a user through an input device and outputs a result through an output device. For example, the gaming device may be in the form of a personal computer (PC), a laptop computer, a game console, a smartphone, a tablet PC, or a wearable device, such as a smart band or a smart watch. In addition, any hardware that satisfies the above definition may be construed to be the gaming device.

The term "online game" as used herein will be understood to mean a game that is played via a network. Generally, the online game means a game that can be played by connecting two or more gaming devices in remote locations via a network or synchronizing the two or more gaming devices via a server. The form of the gaming device that executes a game is not be limited as long as the above definition is satisfied. Not only games executed in a PC or a game console, but also games executed in mobile devices, such as smartphones, or games executed on cloud or executed by interlocking multiple, different gaming devices (including different types of gaming devices) may be construed to be included in the online game as long as the above definition is satisfied.

The term "input device" as used herein will be understood to mean a device for inputting data to a gaming device. For example, the input device may be an input device dedicated for operation of a game and manufactured in the form of a joystick, a mouse, a keyboard, a touch screen, a hardware button, a steering wheel, an instrument, a gun, a glove, a footplate, or the like. In addition, examples of the input device may include various sensors (e.g., a temperature sensor, an infrared sensor, a motion sensor, a gyro sensor, an acceleration sensor, a gravity sensor, etc.) mounted in or interlocked with the gaming device and positioning devices, such as a global positioning system (GPS), an indoor positioning system.

The term "output device" as used herein will be understood to mean a device for displaying a calculation result of a gaming device. The calculation result is displayed in the form that can be perceived through the five human senses. The calculation result is not necessarily limited to being displayed visually or audibly, and may be displayed in an olfactory or tactile form. For example, typical hardware, such as a speaker, a monitor, and a head-mounted display, satisfies the above definition, but a device for outputting a result in a tactile form, such as a three-dimensional (3D) printer, or a device for generating a vibration, scent, and wind may be an example of the input device.

The input device and the output device may be included in a gaming device as elements of the gaming device, or may be connected to the gaming device via a separate wired or wireless interface.

The term "gaming action" as used herein will be understood to mean an action that can be performed in a game according to an input of a user. For example, the gaming action may include not only actions associated with game progression, such as acquiring an item, creating an item, trading an item, moving a character, having conversation with a non-player character (NPC), attacking a character of another user, hunting a monster, performing a quest, opening a skill window, change a skill, setting a character's ability, creating a character, creating a building, a reconnaissance, and upgrading a character or a building, but also actions for game settings, such as selection of a specific menu, game sound adjustment, and screen brightness adjustment. The gaming action is not limited to the above examples and may have various forms according to the genre and type of a game.

FIG. 1 is a diagram illustrating a configuration of a game server 100 according to one embodiment. In disclosed embodiments, the game server 100 may be an apparatus associated with a gaming device 106 of a user through a wired/wireless network for providing a gaming service in various forms to the user. Referring to FIG. 1, the game server 100 according to one embodiment may include a note manager 102 and a note display 104.

Meanwhile, in one embodiment, the note manager 102 and the note display 104 may be implemented using one or more physically separate devices, or may be implemented by one or more processors, or may be implemented by a combination of one or more processors and software, and may not be clearly distinguished in the concrete operation unlike the illustrated embodiment.

The note manager 102 may receive a note at a specific location in a game from the user. In one embodiment, the user provided with a gaming service may input a note using the gaming device 106. The note manager 102 may receive the note from the user through the gaming device 106 and store the note therein. The gaming device 106 may receive the note through various input devices, such as a touch screen, a mouse, a keyboard, and the like. The note may include not only text, such as characters and numbers input by the user, but also an image, such as lines and figures input through a mouse, a touch screen, or the like. The note may contain a variety of information related to a specific location in the game or content, such as precautions of a hunting ground, a location of an NPC, locations of alliance members, a siege warfare strategy, and the like. However, the disclosed embodiments are not limited to a particular type of note, and the note may include a variety of forms and information according to the genre and type of the game.

In addition, according to one embodiment, the note manager 102 may receive a command for activating a note creation function from the user before receiving the note. For example, the user may first activate an in-game note creation function using the gaming device 106 and then input a note. In this case, the note manager 102 may recognize a touch operation or a drag operation which is input through the touch screen after the note creation function is activated as a note input, rather than a control command related to an in-game character.

Meanwhile, the note manager 102 matches the note received from the user with the specific location at which the note is received and stores the note.

In one embodiment, the note manager 102 may match the note with location information on a game screen displayed on the gaming device 106 of the user at the time of receiving the note and store the note. In this case, the location information on the game screen may be coordinates of a specific location at which the character of the user is placed in a virtual space that forms the game. Specifically, the note manager 102 may match the note received from the user with the coordinates of the in-game space displayed at the time of receiving the note, and store the note. For example, when a particular in-game place, such as a particular hunting ground or a particular village, is displayed on the gaming device 106 at the time of receiving the note from the user, the note manager 102 may match the note with in-game coordinates of the particular place and store the note.

In another embodiment, the note manager 102 may match location information selected by the user at the time of receiving the note with the note and store the note. Specifically, the note manager 102 may match the note received from the user with coordinates of a location selected by the user on the game screen at the time of receiving the note and store the note. For example, when a specific location in the game, such as an entrance of a particular hunting ground, an entrance of a particular village, or a particular shop, is selected, the note manager 102 may match the note with coordinates of the selected location and store the note. The particular location may be selected by clicking specific coordinates on the screen using a pointing device, such as a mouse, or touching a screen using a touch screen.

Figure 2:
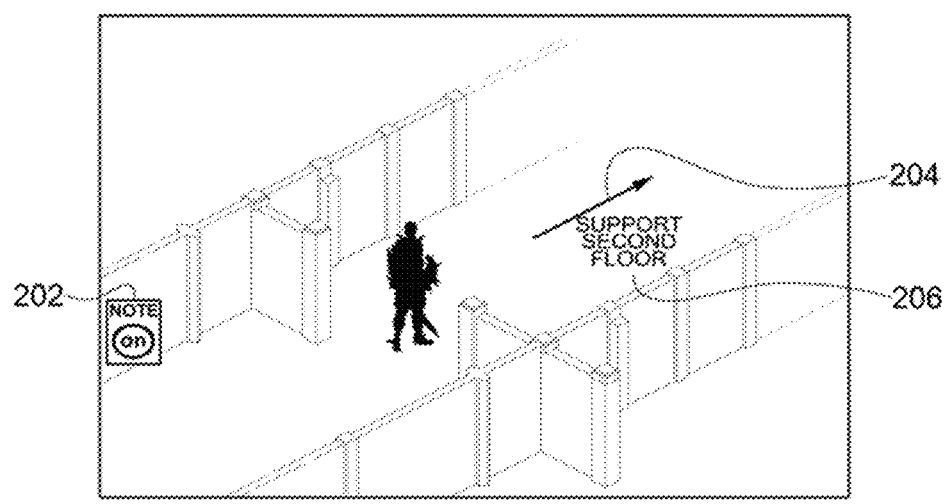
FIG. 2 is an illustration for describing an example in which a note is received from a user and then is stored according to one embodiment.

FIG. 2 is an illustration for describing an example in which a note is received from a user and then is stored according to one embodiment. Referring to FIG. 2, after a note creation function 202 is activated by the user, the note manager 102 may receive a note comprised of an arrow-shaped image 204 and text 206 of "SUPPORT SECOND FLOOR" on the game screen from the user and store the note. In this case, the note manager 102 may match the note with coordinates of a position touched by the user on the game screen at the time of receiving the note and store the resultant note.

Meanwhile, in one embodiment, the note manager 102 may receive a path along which the in-game character of the user moves for a predetermined period of time as a note. For example, the note manager 102 may receive a path along which the in-game character of the user moves between the time of receiving the command for activating the note creation function from the user and the time of receiving a command for releasing (deactivating) the note creation function as a note and store the note. In this case, the predetermined period of time may refer to a period of time during which the note creation function is activated by the user. Meanwhile, in the above example, the predetermined period of time is illustrated as a period of time during which the note creation function is in an activated state set by the user, but the embodiment is not limited thereto. The predetermined period of time may be set in various ways.

According to one embodiment, in addition to the path along which the character moves, the note manager 102 may store, along with the path, actions performed by the character in the course of moving along the path.

Figure 3:
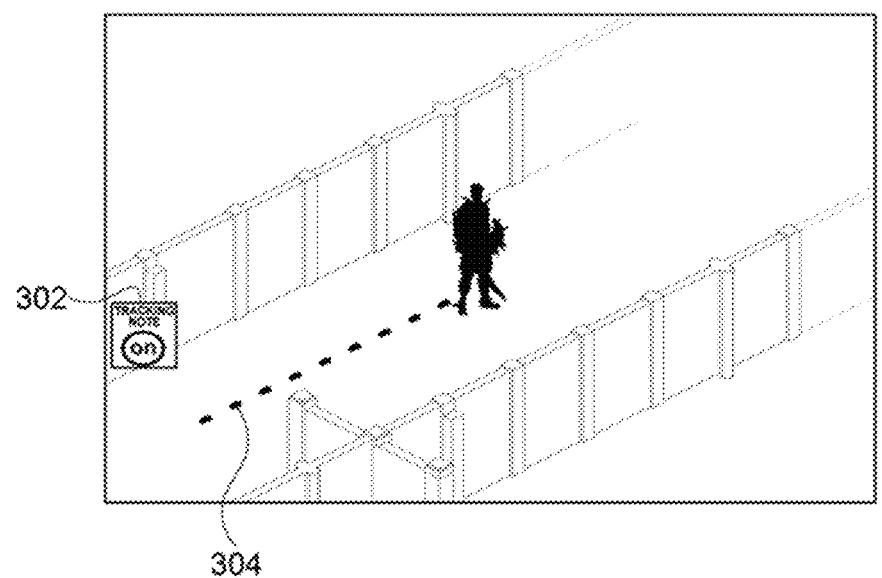
FIG. 3 is an illustration for describing an example in which a note is received from a user and then is stored according to one embodiment.

FIG. 3 is an illustration for describing an example in which a note is received from a user and then is stored according to one embodiment. Referring to FIG. 3, the note manager 102 may receive, as a note, a path 304 along which the in-game character of the user moves during a period for which a tracking note creation function 302 has been activated by the user, and store the note. In this case, the note manager 102 may match the note with each coordinate on the path along which the character of the user moves, and store the note. The tracking note creation function refers to the above-described note creation function, which is only different in representation.

In one embodiment, the note manager 102 may receive information of one or more other users which whom to share the note from the user, associate the received information of other users with the note, and store the note.

The other users mean game users of the game that the user is playing. For example, the other users may mean users stored in a user's friend list in the game, users in a guild that the user has joined in the game, users in a part to which the user is belonging in the game, but are not limited thereto. The other users may include various forms according to the genre and type of the game.

Figure 4:
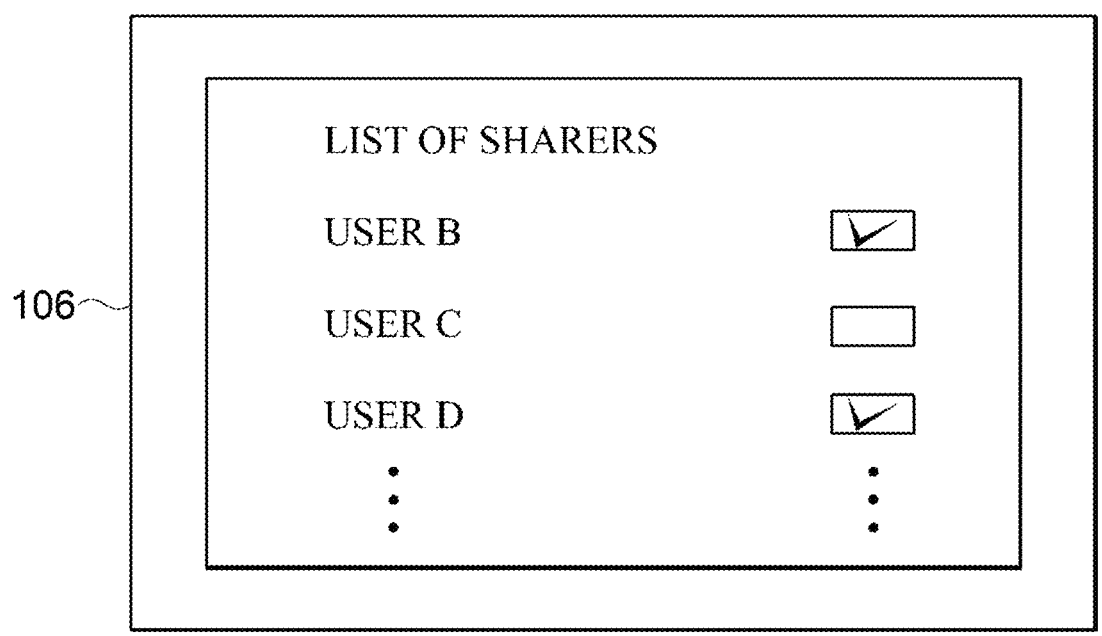
FIG. 4 is a diagram for describing an example in which a information on other user to share a note is received according to one embodiment.

FIG. 4 is a diagram for describing an example in which a information on other user to share a note is received according to one embodiment. Referring to FIG. 4, for example, the note manager 102 may provide a user interface that provides the user with a list of other users who are to share a note with the user through the gaming device 106. In this case, when the user selects other users to share a note, for example, user B and user D, from the provided list of other users, the note manager 102 may associate information related to the selected users, for example, unique IDs of user B and user D, with the note received from the user, and store the note.

Meanwhile, in one embodiment, the note manager 102 may receive a validity period of the note from the user, associate the input validity period with the note, and store the note. In this case, the validity period may be received in the form of a specific date (e.g., Apr. 30, 2018) or a specific period (e.g., a week, a month, etc.). In addition, when the validity period of the note has expired, the note manager 102 may delete the note. For example, when the validity period of the stored note is input as Apr. 30, 2018, the note manager 102 may delete the note at a point of time when the date of Apr. 30, 2018 has passed. In another example, when the validity period of the stored note is input as one-week, the note manager 102 may delete the note at a point of time when one week has elapsed since the validity period was input. In this case, the note manager 102 may provide a notification message regarding the validity period of the note to the gaming device 106. For example, the note manager 102 may provide a notification message informing that the note is to be deleted due to the expiration of the validity period of the note through visually displayed text or an audibly output voice signal. At a specific point in time before the expiration of the validity period of the note, the notification may be provided to the gaming device 106 of the user who has created the note.

As described above, the validity period is assigned to the note so that the note manager 102 may efficiently manage storage space in the server. In addition, when the user creates a volatile message, for example, a note related to a temporary event or a note associated with a related date or period, the user may set a validity period of the note, thereby reducing the trouble of separately deleting the note.

Then, when a specific location is displayed on the gaming device 106 of the user, the note display 104 may output the note matched with the specific location through the gaming device 106. For example, when the specific location associated with the note stored in the note manager 102 is displayed while the in-game character of the user is moving in the gaming device 106 of the user, the note display 104 may display the stored note through the gaming device 106. For example, it is assumed that a note related to a particular shop in an in-game village is matched with a location of the shop and is stored in the note manager 102. When the in-game character of the user moves to a place where the particular shop is located so that the shop is displayed on the gaming device 106, the note display 104 may output a note matched with the location of the shop to a screen. In this case, the note display 104 may display the note through a visual output device, such as a monitor, or an auditory output device, such as a speaker.

In one embodiment, when the specific location is displayed on gaming devices 106 of one or more other users to share the note stored in the note manager 102, the note display 104 may output the note through the gaming devices 106 of other users.

For example, it is assumed that the note manager 102 receives a note at a point X in the game from user A, matches the note with the point X, and stores the note and the note manager 102 receives information on user B to share the note, associates the note with the information on user B, and stores the note. In this case, when the point X is displayed on a gaming device 106 of user B while an in-game character of user B is moving, the note display 104 may output the stored note that was received at the point X from user A through the gaming device 106 of user B.

In addition, in one embodiment, the note display 104 may mark a specific position on a map displayed on the gaming device 106 of the user and display the specific position along with the map. For example, the note display 104 may mark the specific position matched with the note input by the user on an in-game map displayed on the gaming device 106 of the user and display, through the gaming device 106, the map on which the specific position is marked. For example, the note display 104 may display a mark indicating that a note is present at a point corresponding to the specific position on the in-game map, and display the map on which the mark is displayed. In this case, the map may be formed by reducing a place in the game, and may include, for example, an in-game map, a mini-map, and the like.

Figure 5:
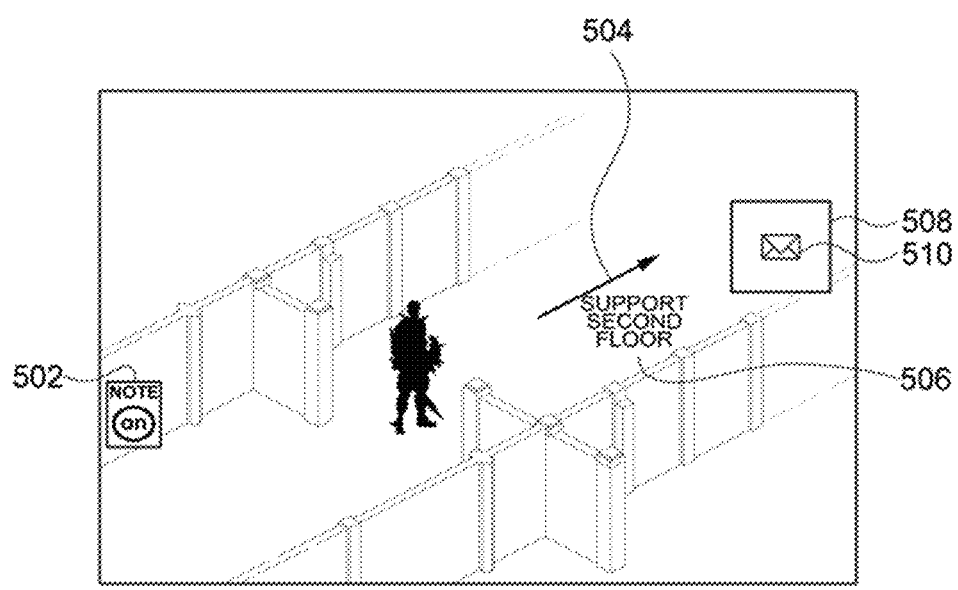
FIG. 5 is an illustration for describing an example in which a specific location is marked on a map displayed on a gaming device and is displayed along with the map according to one embodiment.

FIG. 5 is an illustration for describing an example in which a specific location is marked on a map displayed on the gaming device 106 and is displayed along with the map according to one embodiment. For example, it is assumed that after a note creation function 502 is activated by the user, the note manager 102 receives a note 504 and 506 from the user, matches the note with a specific location, and stores the note. In this case, referring to FIG. 5, the note display 104 may mark the specific location matched with the note 504 and 506 on a mini-map 508 displayed on the gaming device 106 of the user, and display the mini-map 508 on which the specific location is marked. At this time, a specific mark 510 related to the specific location may be displayed on the mini-map 508. The specific mark 510 is not limited to a figure shown in FIG. 5, and may include not only an image, such as lines and figures, but also various forms, such as characters, numbers, and the like.

Figure 6:
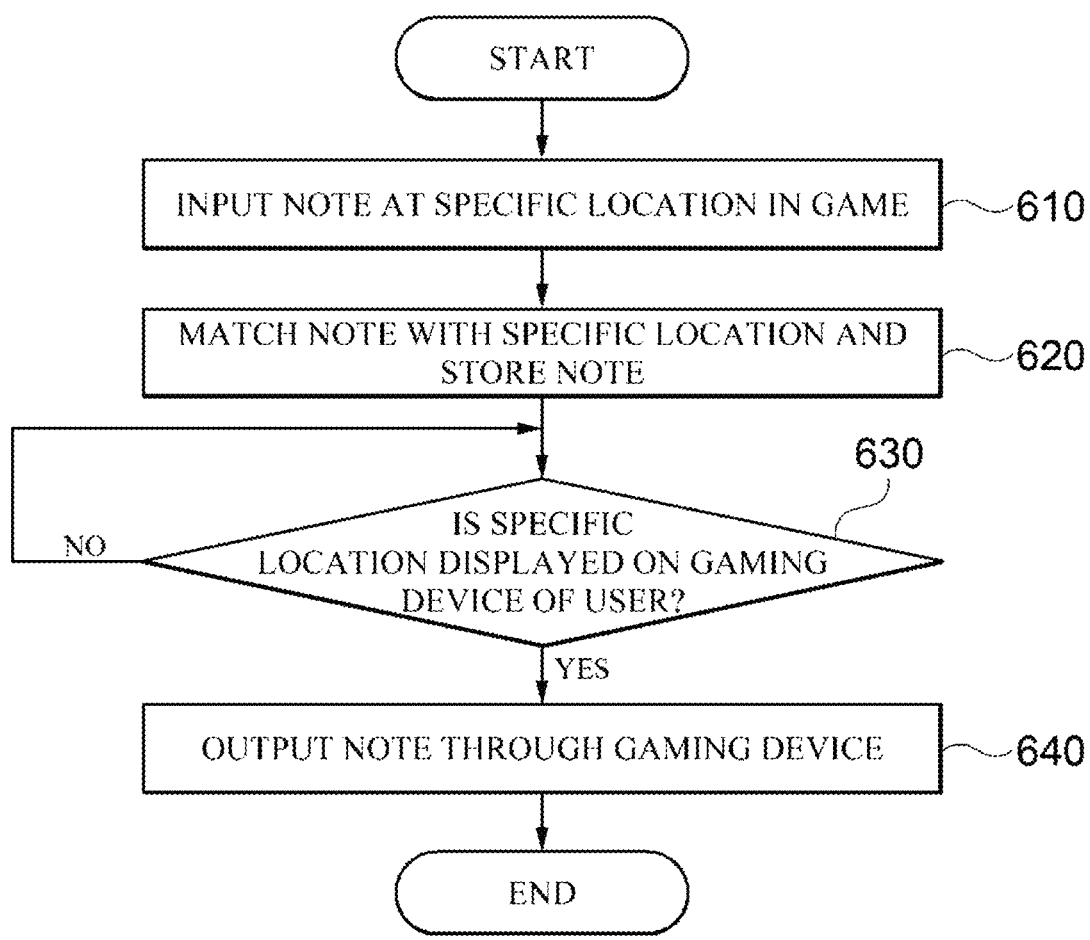
FIG. 6 is a flowchart illustrating a method of sharing a note in a game server 100 according to one embodiment.

FIG. 6 is a flowchart illustrating a method of sharing a note in a game server 100 according to one embodiment. The method shown in FIG. 6 may be performed by a computing device including one or more processors and a memory in which one or more programs executed by the one or more processors are stored, for example, by the game server 100 shown in FIG. 1. In the illustrated flowchart described herein, one process is illustrated as being divided into a plurality of operations. However, it should be noted that at least some of the operations may be performed in different order or may be combined into fewer operations or further divided into more operations. In addition, some of the operations may be omitted, or one or more extra operations, which are not illustrated, may be added to the flowchart and be performed.

In operation 610, the game server 100 receives a note at a specific location in a game from a user.

In operation 620, the game server 100 matches the note input in operation 610 with the specific location and stores the note. In this case, the game server 100 may match the note with location information on a game screen displayed on the gaming device 106 of the user at the time of receiving the note and store the note.

In operation 630, the game server 100 may determine whether the specific location matched with the note input in operation 610 is displayed on the gaming device 106 of the user.

When it is determined in operation 630 that the specific location is displayed, the game server 100 outputs the note matched with the specific location through the gaming device 106 in operation 640. Otherwise, when it is determined in operation 630 that the specific location is not displayed, the game server 100 repeatedly perform operation 630 at predetermined intervals.

Figure 7:
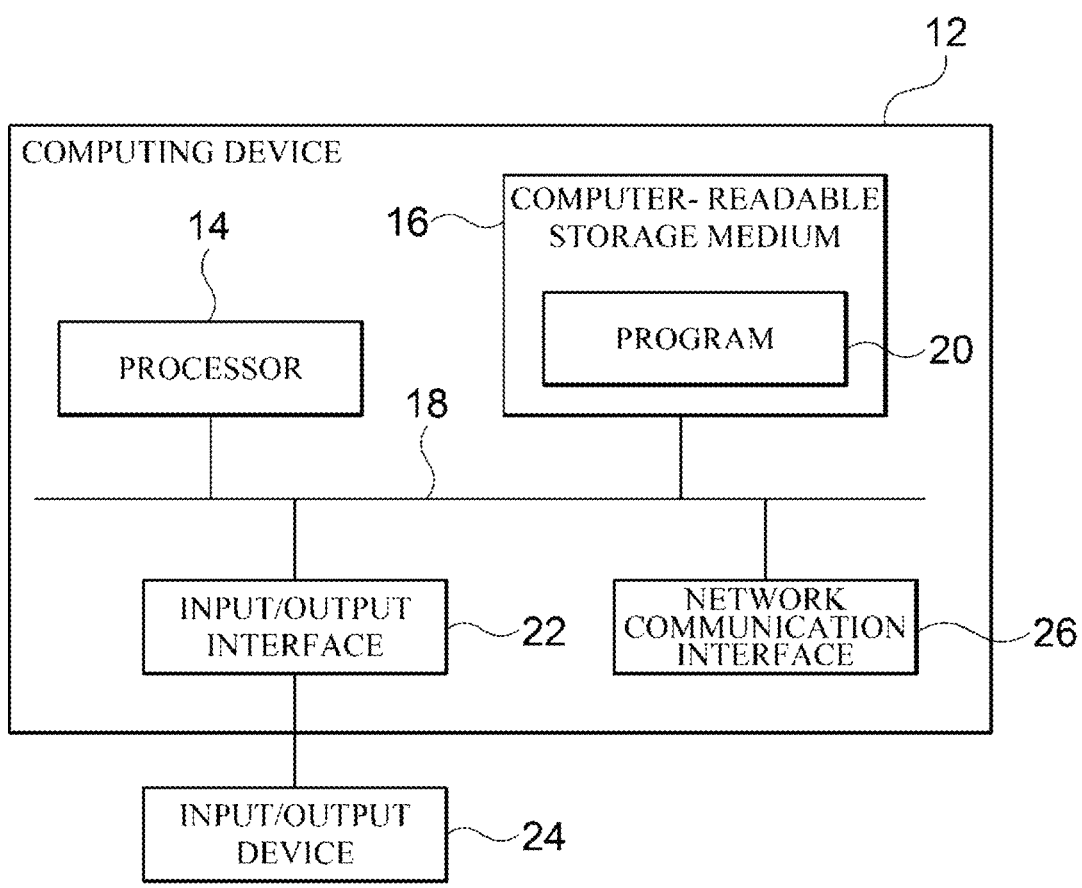
FIG. 7 is a block diagram for describing a computing environment including a computing device suitable to be used in exemplary embodiments.

FIG. 7 is a block diagram for describing a computing environment including a computing device suitable to be used in exemplary embodiments. In the illustrated embodiment, each of the components may have functions and capabilities different from those described hereinafter and additional components may be included in addition to the components described herein.

The illustrated computing environment 10 includes a computing device 12. In one embodiment, the computing device 12 may be one or more components included in a game server 100.

The computing device 12 includes at least one processor 14, a computer-readable storage medium 16, and a communication bus 18. The processor 14 may cause the computing device 12 to operate according to the above-described exemplary embodiment. For example, the processor 14 may execute one or more programs stored in the computer-readable storage medium 16. The one or more programs may include one or more computer executable commands, and the computer executable commands may be configured to, when executed by the processor 14, cause the computing device 12 to perform operations according to the illustrative embodiment.

The computer readable storage medium 16 is configured to store computer executable commands and program codes, program data and/or information in other suitable forms. The programs stored in the computer readable storage medium 16 may include a set of commands executable by the processor 14. In one embodiment, the computer readable storage medium 16 may be a memory (volatile memory, such as random access memory (RAM), non-volatile memory, or a combination thereof) one or more magnetic disk storage devices, optical disk storage devices, flash memory devices, storage media in other forms capable of being accessed by the computing device 12 and storing desired information, or a combination thereof.

The communication bus 18 connects various other components of the computing device 12 including the processor 14 and the computer readable storage medium 16.

The computing device 12 may include one or more input/output interfaces 22 for one or more input/output devices 24 and one or more network communication interfaces 26. The input/output interface 22 and the network communication interface 26 are connected to the communication bus 18. The input/output device 24 may be connected to other components of the computing device 12 through the input/output interface 22. The illustrative input/output device 24 may be a pointing device (a mouse, a track pad, or the like), a keyboard, a touch input device (a touch pad, a touch screen, or the like), an input device, such as a voice or sound input device, various types of sensor devices, and/or a photographing device, and/or an output device, such as a display device, a printer, a speaker, and/or a network card. The illustrative input/output device 24 which is one component constituting the computing device 12 may be included inside the computing device 12 or may be configured as a separate device from the computing device 12 and connected to the computing device 12.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A game server comprising:
a communication interface; and
a processor configured to:
receive, through the communication interface, a note at a specific location selected by a user on a game screen while a user is playing a game with a gaming device displaying a screen comprising the game screen and an in-game map overlaying the game screen and distinguished from the game screen;
match the note at the specific location selected by the user on the game screen with coordinates of the specific location, and store the note to a storage medium; and
when the specific location is displayed on the game screen of the gaming device, output the note at the specific location through the gaming device,
wherein the processor is further configured to mark the specific location on the in-game map displayed on the gaming device and display the specific location along with the in-game map.

2. The game server of claim 1, wherein the processor is further configured to match the note with location information on a game screen displayed on the gaming device of the user at the time of receiving the note and store the note to the storage medium.

3. The game server of claim 1, wherein the processor is further configured to receive, through the communication interface, information on one or more other users to share the note from the user, associate the received information on the one or more other users with the note, and store the note to the storage medium.

4. The game server of claim 3, wherein the processor is further configured to, when the specific location is displayed on gaming devices of the one or more other users, output the note through the gaming devices of the one or more other users.

5. The game server of claim 1, wherein the processor is further configured to receive, through the communication interface, a validity period of the note from the user, associate the note with the received validity period, and store the note to the storage medium.

6. The game server of claim 1, wherein the specific location is different from a location of a character of a user on the game screen.

7. The game server of claim 1, wherein the processor is further configured to receive, through the communication interface, as the note, a path along which an in-game character of the user moves in the game for a predetermined period of time, and store the path along with one or more actions performed by the in-game character in the course of moving along the path.

8. A method of sharing a note in a game server comprising:
receiving a note at a specific location selected by a user on a game screen while a user is playing a game with a gaming device displaying the game screen and an in-game map overlaying the game screen;
matching the note at the specific location selected by the user on the game screen with coordinates of the specific location;
storing the note; and
when the specific location is displayed on the game screen of the gaming device, outputting the note through the gaming device,
wherein the outputting of the note further comprises marking the specific location on the in-game map displayed on the gaming device and displaying the specific location along with the in-game map.

9. The method of claim 8, wherein the storing of the note comprises matching the note with location information on a game screen displayed on the gaming device of the user at the time of receiving the note, and storing the note.

10. The method of claim 8, wherein the storing of the note comprises receiving information on one or more other users to share the note from the user, associating the received information on other users with the note, and storing the note.

11. The method of claim 10, wherein the outputting of the note comprises, when the specific location is displayed on gaming devices of the one or more other users, outputting the note through the gaming devices of the one or more other users.

12. The method of claim 8, wherein the storing of the note comprises receiving a validity period of the note from the user, associating the note with the received validity period, and storing the note.

13. The method of claim 8, wherein the specific location is different from a location of a character of a user on the game screen.

14. The method of claim 8, wherein the receiving of the note comprises receiving, as the note, a path along which an in-game character of the user moves in the game for a predetermined period of time; and the storing of the note comprises storing the path along with one or more actions performed by the in-game character in the course of moving along the path.

\* \* \* \* \*